United States Patent [19]

Cardarelli

[11] 4,167,074
[45] Sep. 11, 1979

[54] THREE DIMENSIONAL SPACE VIEWING DEVICE

[76] Inventor: James F. Cardarelli, 117 Reed St., Rockland, Mass. 02370

[21] Appl. No.: 851,130

[22] Filed: Nov. 14, 1977

Related U.S. Application Data

[63] Continuation-in-part of Ser. No. 721,556, Sep. 8, 1976, abandoned.

[51] Int. Cl.² .............................................. G09F 11/24
[52] U.S. Cl. ...................................... 40/438; 40/472; 40/543; 40/577
[58] Field of Search ................. 40/438, 436, 434, 472, 40/543, 577

[56] References Cited

U.S. PATENT DOCUMENTS

| | | | |
|---|---|---|---|
| 1,357,409 | 11/1920 | Monahan | 40/431 |
| 1,403,631 | 1/1922 | Pyper | 40/438 |
| 1,841,844 | 1/1932 | Norworth | 40/438 |
| 2,102,474 | 12/1937 | McKenna et al. | 40/438 |
| 2,196,423 | 4/1940 | Musaphia | 40/472 |
| 3,048,935 | 8/1962 | Apatoff et al. | 40/438 |
| 3,054,204 | 9/1962 | Yates | 40/434 |

*Primary Examiner*—John F. Pitrelli
*Attorney, Agent, or Firm*—James J. Cannon, Jr.

[57] ABSTRACT

A three dimensional viewing device which creates the illusion of objects moving in space by utilizing a plurality of illuminated foreground scenes having cutouts through which a moving background scene illuminated with ultraviolet light is visible to provide depth and motion. The device includes a housing, a plurality of upwardly extending side walls, a rear wall, a removable top and a front wall with a large opening therethrough for viewing the displays. The entire device forms a viewing chamber. Provision is made in the front of the chamber for a plurality of vertically oriented picture members to be secured in guide tracks along the side walls and behind the viewing opening. These picture members, having a plurality of cutouts therethrough, are illuminated by a light mounted near top of the front panel. A vertically extending, continuous loop belt is secured by conventional means across the rear of the viewing chamber and a belt-driven motor provides continuous motion to this continuous loop which is illuminated by ultraviolet light to provide the illusion of the foreground members moving in space against a background of stars or planets.

1 Claim, 6 Drawing Figures

THREE DIMENSIONAL SPACE VIEWING DEVICE

This is a continuation-in-part of application Ser. No. 721,556, filed Sept. 8, 1976, now abandoned.

BACKGROUND OF THE INVENTION

1. Field of the Invention

This invention pertains to the field of illuminated display devices, and in particular to those display devices which provide the illusion of three dimensional movement to the viewer and utilize luminous paint visible only under ultraviolet light. The display device is portable and may be carried by persons.

2. Description of the Prior Art

The prior patent art is replete with various three dimensional viewing devices, both illuminated and non-illuminated. U.S. Pat. No. 3,688,424 to Van Zanten which discloses a pitching motion imparted to a model ship with aperatures simulating stars and the moon with background lighting creating the effect. The present invention is trying to achieve the same effect by keeping the space vehicle stable and in effect moving the stars and planets relative to the foreground display.

U.S. Pat. No. 3,048,935 to Apatoff et al teaches a device which simulates a pouring effect through a lens which views a continuous loop belt, one half of said belt having transversely extending reflector members. This is a commercial display device and functions differently from the device of the present invention.

U.S. Pat. No. 2,196,423 to Musaphia teaches a device for creating motion effects in which portions of the object to be moved are on the carrier. The device of Musaphia is more complicated than the device of the present invention, requiring rocking spindles with their associated mechanics.

The present invention is primarily a device to create a three dimensional illusion of objects such as space ships and shuttles moving through outer space against a background of stars and planets in a very simple device.

SUMMARY OF THE INVENTION

This invention pertains to a three dimensional viewing device which creates the illusion of rockets and space ships moving through space against a background of stars and planets by utilizing a plurality of foreground scenes having cutouts therein through which a moving background scene illuminated with ultraviolet light is visible to provide depth and motion. The background scene, in the form of a continuous cloth curtain has various star and planetary scenes painted on it in paints which are only visible under ultraviolet light, thus when illuminated by ultraviolet light it provides the illusion of considerable depth. The invention provides for one or more foreground scenes which are illuminated and appear to be moving relative to the background scene.

The present invention comprises a housing having a base, a plurality of upward extending side walls, a rear wall, a removable top and a front wall having a large viewing opening therethrough. The background scene, which is a continuous belt of black material having various scenes painted on it in paints sensitive only to ultraviolet light is mounted toward the rear of the viewing chamber. A plurality of bearing blocks are mounted on the top and base of the chamber near the rear sides thereof. A first spindle rod is vertically disposed in the chamber such that the ends of the first spindle rod are journaled in the first pair of bearing blocks. A second spindle rod is vertically disposed at the other side of said chamber such that the ends of the second spindle rod are journaled in the second pair of bearing blocks. A first cylindrically shaped member is mounted on the first spindle rod and a first pulley member is also mounted thereto. A V-shaped belt communicates between the first pulley member and a second pulley member mounted on the vertical drive shaft of an electric motor disposed within the chamber. A second cylindrically shaped drum member is mounted on the second spindle rod. The continuous loop belt member having scenes painted upon its black surface in paints visible only under ultraviolet light is engaged between said two drum members and revolves continuously as long as said motor is turned on. The scenes on this continuous black belt, which reaches from near the top to near the bottom of the chamber are illuminated by one or more ultraviolet lights suitably disposed within the chamber.

Toward the front of the viewing chamber, along each of its side walls are disposed a plurality of vertical ribs, each pair of which is disposed to receive a fixed foreground scene. One or more foreground picture members may be inserted within said ribs disposed vertically in front of said black belt member. Each of said foreground picture members has one or more cutouts therethrough to permit the illusion of the foreground picture member subject matter moving relative to the background scene. The foreground picture members may be illuminated by a conventional light source.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
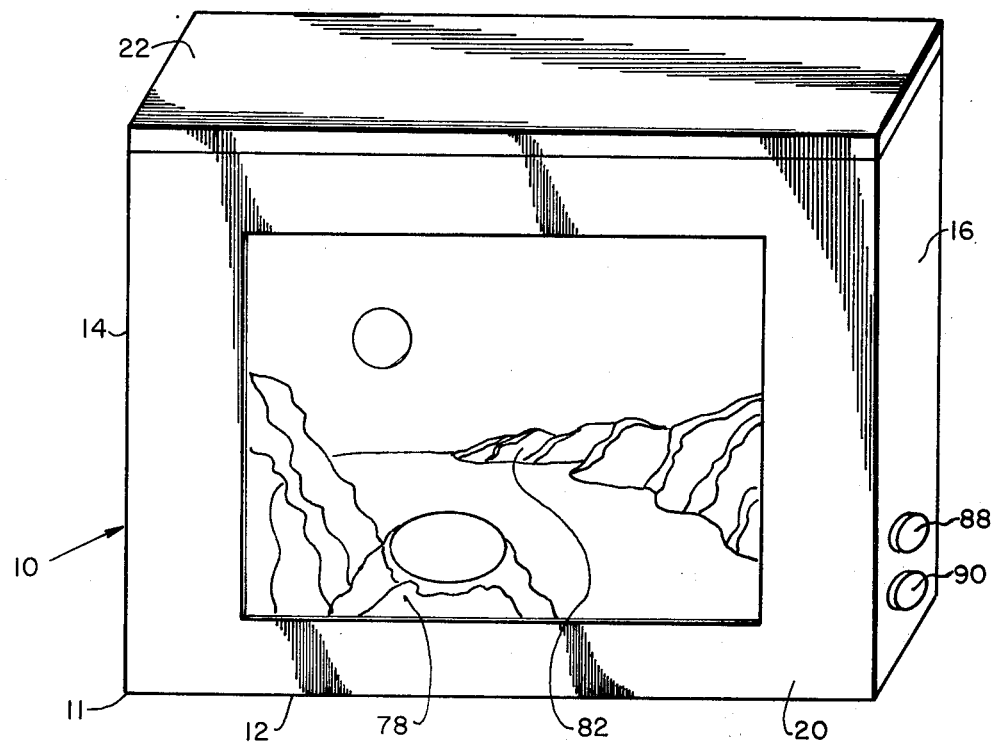
FIG. 1 illustrates a front perspective view of a three dimensional space viewing device.

Referring now to the drawings, in which similar reference numerals denote similar elements throughout the several views, FIG. 1 shows a three diminsional space viewing device 10 adapted to have a changeable and moving background scene and changeable foreground scenes.

The device 10 generally comprises a housing 11 having a base 12, a pair of upwardly extending side walls 14, 16, an upwardly extending rear wall 18, an upwardly extending front wall 20, a removable top 22, a viewing opening 23 in said front wall 20, all of the components of said housing 11 defining a chamber 24 therein.

Figure 2:
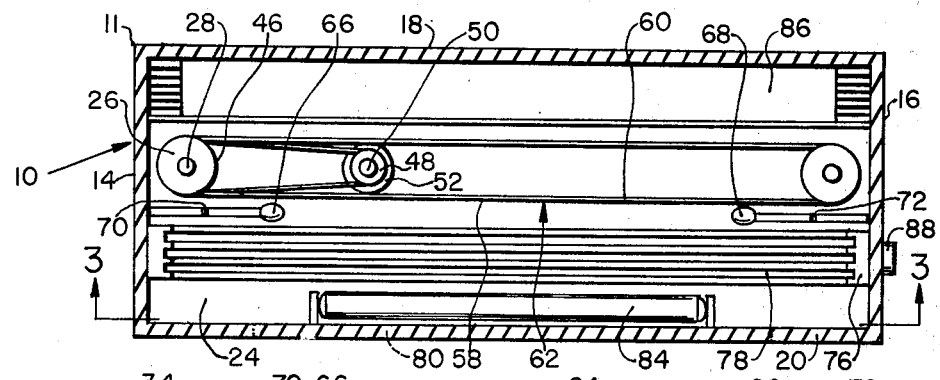
FIG. 2 illustrates a top cross-sectional view of the device.

Referring now to FIG. 2, which is a top cross-sectional view of viewing device 10, I shall first describe the mechanism which causes the background scenes to revolve to create the illusion of motion. A first cylindrically shaped drum member 26 is disposed on a first vertically aligned spindle member 28 disposed towards the left rear portion of chamber 24 where ends 30, 32 (FIG. 3) are journaled in bearing blocks 34, 36 (FIG. 3) mounted on the base 12 and top 22 within chamber 24. A second cylindrically shaped drum member 38 is mounted on a second vertically aligned spindle member 40 disposed in the left rear of chamber 24, wherein ends 42, 44 of spindle member 40 are journaled in similar bearing blocks 34, 36 mounted on the top 22 and the base 12 of chamber 24. A first pulley member 46 is mounted on spindle member 28 (FIG. 3) below drum member 26 within chamber 24. A second pulley member 48 is mounted on an upwardly extending vertical drive shaft 50 of an electric motor 52 mounted on base 12 within chamber 24, wherein an electrical lead cord 54 with end male plug 56 extends outwardly through the rear wall 18 of housing 11. (FIG. 3)

Figure 3:
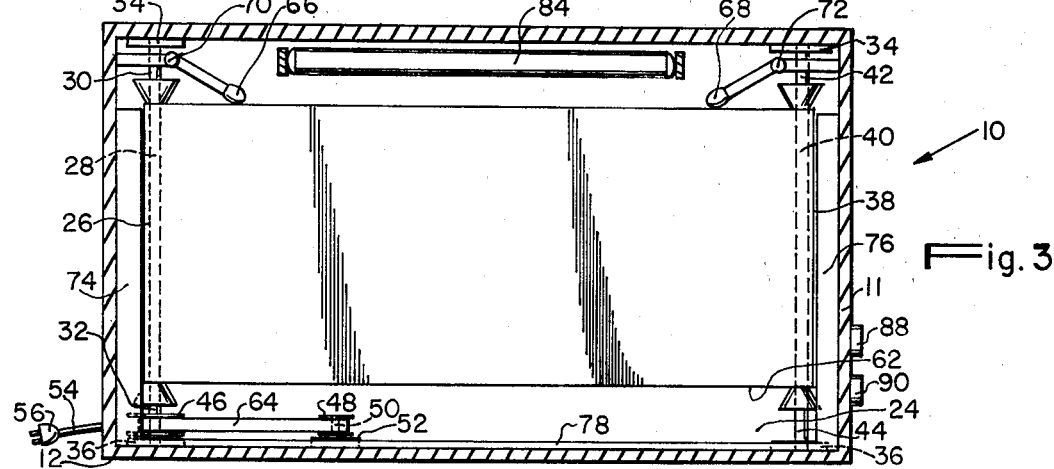
FIG. 3 illustrates a rear cross-sectional view of the device.

Referring more in detail to FIG. 3, which is a rear cross-sectional view of device 10, a black velvet fabric 58 or similar substance is adhesively secured onto a rubber backing 60 to form a continuous belt 62 which on the horizontal plane extends between and is engaged around cylindrically shaped drum members 26, 38 and on the vertical plane extends the full height of said drum members. Black fabric 58 is the substance on which background scenes of stars, planets and other celestial bodies are painted with paints which are visible only under ultraviolet light. The combination of a black background with paints sensitive only to ultraviolet light provides a significant illusion of depth in the depicted scene. A V-shaped drive belt 64 communicates between pulley members 46, 48, thereby providing means for moving the background scenes on continuous loop 62 when electric motor 52 is activated.

A pair of black (ultraviolet) light members 66, 68 are mounted onto foldable arm members 70, 72, wherein each arm member is mounted onto one of the side walls 14, 16 within chamber 24. These lights 66, 68 may be otherwise suitably disposed to create the desired effects.

Referring back to FIG. 2, provision is made for the foreground picture members by a pair of channel members 74, 76 disposed vertically along side walls 14, 16 of chamber 24 and forward of ultraviolet lights 64, 66. Each channel member 74, 76 is adapted to receive the side edges of one or more foreground picture members 78, thereby vertically aligning the picture member 78 behind the large rectangular viewing opening 80 (FIG. 1) in front wall. Each picture member 78 has a plurality of cutouts 82 therein for permitting the moving background scenes on continuous belt 62 to be viewed through the cutouts 82 of the foreground picture members 78, thereby creating the illusion of movement of the foreground picture subjects. A fluorescent light member 84 is mounted on the upper inside surface of front wall 20 within chamber 24 in front of picture members 78 to illuminate picture members 78 if desired. A plurality of vertically aligned slot holders 86 are disposed in chamber 24 rearwardly of belt 62, wherein slot holders 86 are adapted to receive spare belts 62 and picture members 78. An electric knob switch 88 for the fluorescent light member 84 is disposed in side wall 16, wherein light member 84 and switch member 88 are wired in parallel across electric knob switch 90 for ultraviolet light members 66, 68, is disposed in side wall 16 and wired in series to light members 66, 68, wherein the series circuit of switch 90 and members 66, 68 are wired in parallel to motor 52.

Figure 4:
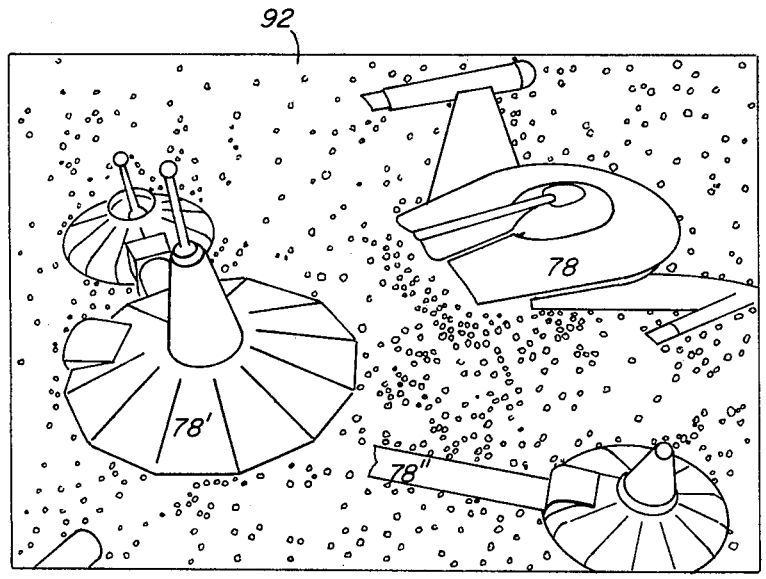
FIGS. 4, 5 and 6 illustrate typical foreground picture members against typical background scenes.
Figure 5:
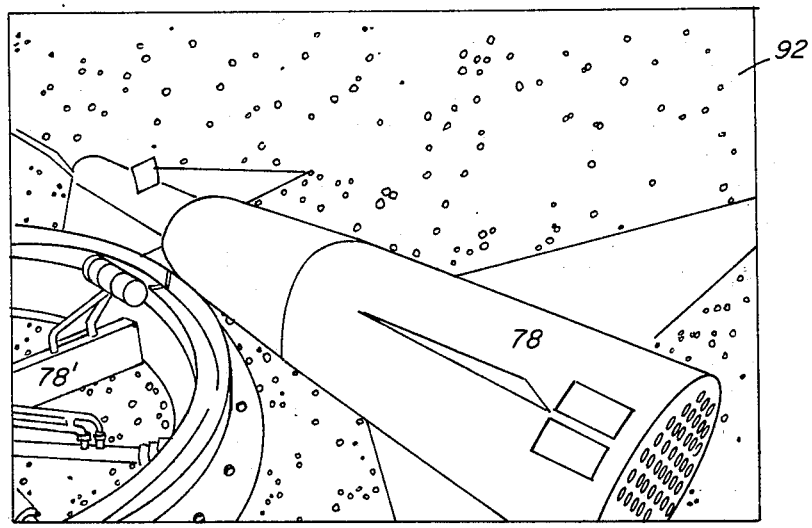
Figure 6:
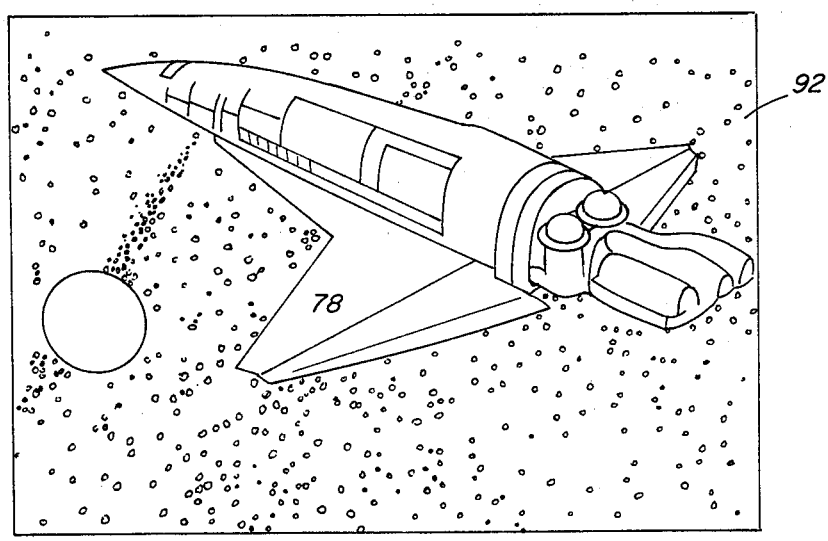

FIGS. 4, 5, and 6 illustrate a typical selection of scenes which may be viewed through viewing device 10. In FIG. 4, foreground picture members 78, 78$^1$ and 78$^{11}$ would appear to be moving against background scene 92, when motor 52 and lights 66, 68 and 84 are turned on. In this scene three foreground picture members 78 are utilized. In FIG. 5, only two foreground picture members 78 and 78$^1$ are used. FIG. 6 uses only one foreground picture members 78. Even though continuous belt 62 having background scene 92 is moving, device 10 gives the illusion that the foreground picture members 78 are moving.

Since obvious changes may be made in the specific embodiment of the invention described herein, such modifications being within the spirit and scope of the invention claimed, it is indicated that all matter contained herein is intended as illustrative and not as limiting in scope.

I claim:

1. A three dimensional viewing device for creating the illusion of space vehicles moving in interplanetary space comprising:
   a housing means having a viewing opening in the front surface thereof and a viewing chamber in the interior thereof;
   said housing having a base, a plurality of upwardly extending walls, a top, and a chamber therein, one said wall having said large viewing opening therethrough;
   a plurality of bearing blocks mounted on said top and said base within said chamber;
   a first spindle rod vertically disposed in said chamber, the ends of said first spindle rod journaled in a first pair of said bearing blocks;
   a second spindle rod vertically disposed in said chamber, the ends of said second spindle rod journaled in a second pair of said bearing blocks;
   a first cylindrically shaped drum member mounted on said first spindle rod;
   a first pulley member mounted on said first spindle member;
   a second cylindrically shaped drum member mounted on said second member;
   an electric motor having a vertically upwardly extending drive shaft, said motor disposed in said chamber;
   a second pulley member disposed on said drive shaft;
   a V-belt communicating between said first and second pulley members;
   a continuous movable black belt member having planetary scenes painted thereon in paints sensitive only to ultraviolet light vertically oriented and disposed toward the rear of said viewing chamber, visible from the front of said chamber, and forming a background scene;
   said belt member engaging around said first and said second drum members such that the activation of said electric motor will cause said continuous black belt member to revolve around said drum members providing a continuous background scene in the vertical plane;
   at least one foreground picture member in vertical alignment with said background scene vertically mounted in said chamber forward of said continuous black belt, said foreground picture member having cutouts to permit the viewing of said black belt;
   ultraviolet light means positioned to illuminate said background black belt;

fluorescent light means positioned to illuminate said foreground picture member;
said foreground picture members are held in vertical alignment with said background scene by a means comprising:
a pair of channel members;
said channel members affixed vertically to opposed interior surfaces of the side walls of said housing; and
each of said channel members being capable of receiving the outer side edges of said picture members therein.

* * * * *